(12) United States Patent
Karstens

(10) Patent No.: US 8,105,165 B2
(45) Date of Patent: Jan. 31, 2012

(54) CONTROLLING INTERACTION BETWEEN PROTECTED MEDIA

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1110 days.

(21) Appl. No.: 11/941,491

(22) Filed: Nov. 16, 2007

(65) Prior Publication Data

US 2009/0131172 A1    May 21, 2009

(51) Int. Cl.
G06F 17/00 (2006.01)
(52) U.S. Cl. .................................................. 463/40
(58) Field of Classification Search ............... 463/40–42; 709/217–219
See application file for complete search history.

(56) References Cited

U.S. PATENT DOCUMENTS

| | | | | |
|---|---|---|---|---|
| 6,044,378 | A | * | 3/2000 | Gladney ................................ 1/1 |
| 7,152,108 | B1 | * | 12/2006 | Khan et al. ..................... 709/225 |
| 2003/0216958 | A1 | * | 11/2003 | Register et al. .................. 705/14 |

* cited by examiner

*Primary Examiner* — Ronald Laneau
(74) *Attorney, Agent, or Firm* — Jeffrey N. Giunta; Fleit Gibbons Gutman Bongini & Bianco PL

(57) ABSTRACT

A method, gaming system, and computer program storage product are disclosed. At least one unique identifier is received from a remote processing system. The at least one remote unique identifier is associated with a remote software package that is on the remote processing system. The at least one remote unique identifier and a local unique identifier associated with a local software package on a local processing system are compared. The local software package corresponds to the remote software package. The at least one remote unique identifier indicates that the remote software package is one of a parent copy and a child copy of a software package executable. The local unique identifier indicates that the local software package is one of a parent copy and a child copy of the software package executable. An operation of the local software package is authorized based upon the comparing.

23 Claims, 7 Drawing Sheets

CONTROLLING INTERACTION BETWEEN PROTECTED MEDIA

FIELD OF THE INVENTION

The present invention generally relates to the field of content management on electronic devices, and more particularly relates to managing device interactions with other devices based on electronic content coupled to or stored therein.

BACKGROUND OF THE INVENTION

The developments in electronic communications and digital processing of data have greatly increased the distribution of multi-media content such as video games, music, and movies in digital form. These various content types can be distributed electronically via downloads or installed on optical disks, solid state devices such as memory chips, etc. For example, digital audio, including commercial music recordings, have been distributed on Compact Disks ("CDs"), for some time, but the inability to practically store or communicate these relatively large data sets has precluded widespread copying and distribution of digitized media. The same is true for video games, where gaming systems such as gaming consoles or portable gaming systems did not comprise enough storage capacity to store a local copy of a video game.

However, advances in economical storage, high-speed communications and playback of a large amount of digital data has led to the digitizing of video games and other multi-media content including motion pictures, and distributing data sets that contain these types of content on optical disks as well as via electronic communications. Technology advances have also allowed the practical copying of these digital multi-media data sets onto writable media or the communications of these data sets among numerous people. The ability to reproduce original copies of digitized multimedia presentations, coupled with the increased ability to conveniently store and/or communicate the data, has lead to an increase in the copying, pirating and unauthorized sharing of digitized multimedia presentations. This unauthorized copying and distribution of digitized multi-media presentations has resulted in large losses to the owners of the copyrights in those presentations.

Protection techniques have been developed which support controlling different types of usage rights for a media data set. These systems, referred to as Digital Rights Management ("DRM") Systems, are able to restrict access to data sets by limiting authorization to one or more types of usages of a data set in response to specified usage conditions. Access control in these systems is controlled through specified Digital Property Rights ("DPRs"). One example of a DPR is a right to only read a particular media data set for a specified number of times. Such a DPR may be used to provide a free or low cost demonstration of the multi-media data set. Existing systems support a variety of conditions on usage of the media data set and those conditions may be specified on a remote license server, but the available types of usages that may be authorized are fixed by the implementation and may not be flexibly varied by the owners of the copyright on a media data set.

The field of gaming systems and shared gaming environments sometimes requires rights management functions that are not provided by current DRM systems. As discussed above, current gaming systems (gaming consoles and/or portable gaming systems) comprise high capacity storage devices and wireless and/or wired communication technologies. Some gaming systems allow a user to create a local copy of a gaming title on his/her device. This is beneficial to a user since a user is no longer required to carry cartridges, optical disks, etc. comprising the gaming content. A user can have a library of games stored locally on his/her console or portable device. As can be seen, a user of current gaming systems is usually granted the right to make a local copy of a gaming title. DRM systems may permit a user to share the gaming title with friends so that they may also make local copies or play from a local copy. These additional users, however, can then utilize their local copies to interact with other users even though they did not purchase the gaming title.

Therefore a need exists to overcome the problems with the prior art as discussed above.

SUMMARY OF THE INVENTION

In one embodiment, a method for managing interaction between one or more other gaming systems comprising protected media is disclosed. The method includes receiving at least one unique identifier from a remote processing system. The at least one remote unique identifier is associated with a remote software package that is on the remote processing system. The at least one remote unique identifier and a local unique identifier associated with a local software package on a local processing system are compared in response to the receiving. The local software package corresponds to the remote software package. The at least one remote unique identifier indicates that the remote software package is one of a parent copy and a child copy of a software package executable. The local unique identifier indicates that the local software package is one of a parent copy and a child copy of the software package executable. An operation of the local software package is authorized based upon the comparing.

In another embodiment a gaming system is disclosed. The gaming system comprises a memory and a processor that is communicatively coupled to the memory. The gaming system also includes a content manager that is adapted to manage interaction between the game system one or more other gaming systems comprising protected media. The content manager includes a unique identifier receiver adapted to receive at least one unique identifier from a remote processing system. The at least one remote unique identifier is associated with a remote software package that is on the remote processing system. A comparator is adapted to compare, in response to the receiving, the at least one remote unique identifier and a local unique identifier associated with a local software package on a local processing system. The local software package corresponds to the remote software package. The at least one remote unique identifier indicates that the remote software package is one of a parent copy and a child copy of a software package executable. The local unique identifier indicates that the local software package is one of a parent copy and a child copy of the software package executable. An interaction authorizer is adapted to authorize an operation of the local software package based upon the comparing.

In yet another embodiment, a computer program storage product for managing interaction between one or more other gaming systems comprising protected media is disclosed. The computer program storage comprises instructions for receiving at least one unique identifier from a remote processing system. The at least one remote unique identifier is associated with a remote software package that is on the remote processing system. The at least one remote unique identifier and a local unique identifier associated with a local software package on a local processing system are compared in response to the receiving. The local software package corresponds to the remote software package. The at least one remote unique identifier indicates that the remote software package is one of a parent copy and a child copy of a software package executable. The local unique identifier indicates that the local software package is one of a parent copy and a child copy of the software package executable. An operation of the local software package is authorized based upon the comparing.

One advantage of the various embodiments of the present invention is that gaming titles are able to be prevented from interacting with one another based upon the source from which they were copied. For example, some gaming systems allow a user to create a local copy of a gaming title on his/her device. Because the gaming systems allow local copies to be created, a mechanism generally does not exist that prevents other local copies from being made on other gaming systems of the same type using the same source gaming media. These additional local copies may allow a respective user to play the game without having purchased the game. Therefore, one embodiment of the present invention prevents devices from using their local copies to interact (play against/with) with one another based upon the source copy from which local copies were made.

Another advantage of the various embodiments of the present invention is that local software on a gaming system can be limited to interacting with particular groups of software of the same type. For example, gaming titles can be downloaded from various on-line stores. Various embodiments of the present invention limit the interaction of a particular gaming title copy that was downloaded from a particular source location to only interact with other gaming titles based upon the source location from which those other gaming titles were copied. For example, only copies of game titles that were made from a copy associated with a particular retailer are able to interact with a particular game title that was made from a copy associated with that particular retailer. This allows the on-line stores to provide unique services to its customers.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Example of a Computing Environment

Figure 1:
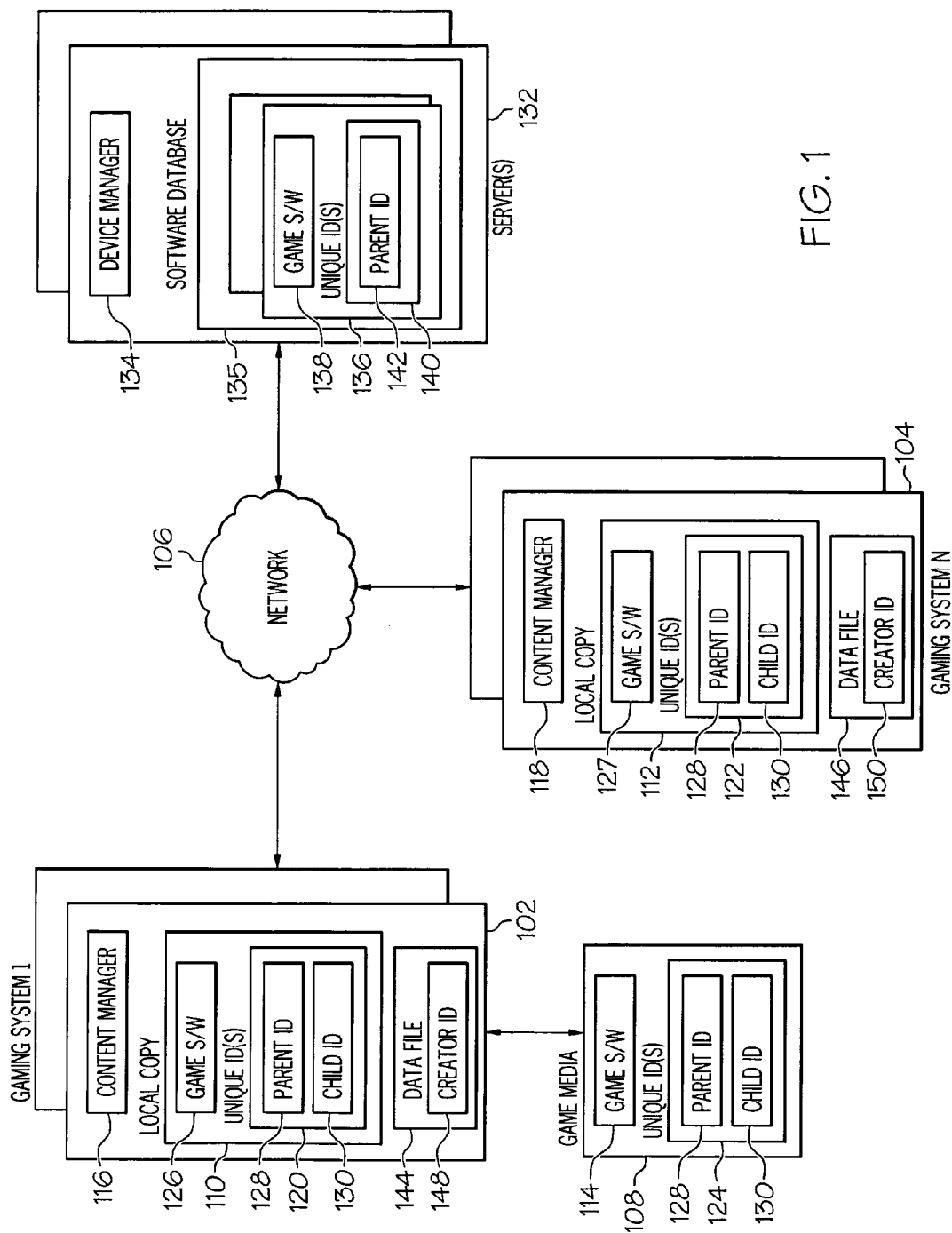
FIG. 1 is a block diagram illustrating one example of a computing environment, according to an embodiment of the present invention.

FIG. 1 is a block diagram illustrating one example of an environment 100 for managing the use of content on gaming systems and for managing the interaction between devices based on the content residing at each device. In particular, FIG. 1 shows a plurality of gaming systems 102, 104 communicatively coupled to each other via a network 106. The network 106, in one embodiment, is a wired or wireless network. It should be noted that each of the gaming systems 102, 104 can also be directly coupled to each other via short range technologies such as IR, Bluetooth, Zigbee, and other short range technologies.

Each of the gaming systems 102, 104 of some embodiments of the present invention are able to be gaming consoles, portable gaming devices, or personal computers. The gaming systems 102, 104 allow a user to play a software package such as a video game 114 stored either on a game media 108 as a software package executable or stored locally via a local copy 110, 112 of the software package executable. The game media 108, in one embodiment, is a cartridge comprising solid state devices, an optical disk, a flash memory device, or any other type of device capable of storing gaming software 114.

Protected Media Interaction Management

As discussed above, some gaming systems are configured so that a local copy 110, 112 of a game 114 residing on a game media 108 can be created on the gaming system 102, 104. This allows users to carry one or more of their games on their gaming systems as compared to physically carrying the one or more copies of their game media 108. However, a user can easily give his/her game media 108 to other users so that they may also make local copies 110, 112 of the game media 108. In some instances the game 114 is a multi-player game where multiple users play against each other. Allowing users to make local copies 110, 112 from a single game media 108 results in a single game media being used to support multiple users playing multi-player games against each other. This usually violates the licensing agreement that accompanies the game media 108

In one embodiment, each of the gaming systems 102, 104 includes a content manager 116, 118. The content manager 116, 118, in one embodiment, controls the use of content on its respective device and the interaction between other gaming systems based on this content. It should be noted that the aforementioned "content" of one embodiment can be the game 114 on the game media 108 and/or the local copy 110, 112. Also, the local copy 110, 112 and/or the game 114 on the game media 108 can also be referred to as a local software package. In particular, the content manager 116, 118, in one embodiment, ensures that a gaming system 102, 104 only interacts with another system that is using a local copy 116 of a game that is associated with a game media 108 that is different than any of the other users or that is using a different game media 108 than the one used to create any of the other users local copies.

Stated differently, if a game media 108 is considered a "parent" and a local copy 110, 112 is considered a "child" because it was created from the parent, the content manager 116, 118 ensures that a gaming system 102, 104 executing a copy that is a child is only able to interact with another system that is executing a child copy that came from a different parent. This configuration prevents users from using local copies made from the same parent to interact with one another (e.g., play a multi-player game against each other) even though those different users can still make local copies of a game from the same gaming media and use it for other purposes. It should be noted that the present invention is not limited to this particular embodiment.

For example, the content manager 116, 118 can also be configured to ensure that a gaming system 102, 104 comprising a local copy 110, 112 that is a child of the same parent copy is prevented from interacting with its parent copy (i.e., the game media 108 used to create those local copies) or that the parent is unable to interact with its children copies. In additional embodiments, the content manager 116, 118 can be configured to allow local copies 110, 112 created from the same game media 108 to only interact with each other (i.e., copies made from the same parent) and/or their parent game media 108.

In one embodiment, when a local copy 110, 112 of a game 114 residing on a game media 108 is created at a gaming system 102, 104, one or more unique identifiers 120, 122 associated with the game media 108 are stored. In one embodiment, the unique identifiers 120, 122 stored at the gaming system 102, 104 are based upon the unique identifiers 124 residing at the game media 108 used to make the local copies 110, 112. These unique identifiers 120, 122 can be stored within the local copy 110, 112 along with the gaming software 126, 127 or can be stored in a unique identifier database (not shown). A unique identifier can be (but is not limited to) a serial number, Media Access Control ("MAC") address, or any other unique sequence of letters, numbers, and/or symbols, that is associated with a game media 108. In one embodiment, the unique identifier 120, 122 are derived or otherwise related to the unique identifier 124 residing at the game media 108 such as, for example, through a hash algorithm, by adding a constant to the unique identifier 124 residing at the game media 108, or through cryptologic means.

The unique identifier 124 residing at the game media 108 of one embodiment is able to include a parent ID 128 and/or a child ID 130. The parent ID 128, in one embodiment, is an identifier used by the content manager 116, 118 to determine that a game media 108 (and not a local copy) is being used to play a game 114. The child ID 130 is an identifier used by the content manager 116, 118 to determine that a local copy 110, 112 is being used to play a game 126, 127. When a user creates a local copy 110, 112 of the game 114 on the gaming system 102, 104 the child identifier 130 is associated with the local copy 110, 112. In one embodiment, the parent identifier 128 is also stored at the local copy for identifying the game media 108 used to create the local copy 110, 112. Therefore, even though local copies are created at different gaming systems 102, 104 they each are associated with the same child identifier 130 since the same game media 108 was used to create the local copy 110, 112. The content manager 116, 118 uses these identifier types 128, 130 for managing content usage and interaction between gaming systems 102, 104 as discussed in greater detail below.

Figure 2:
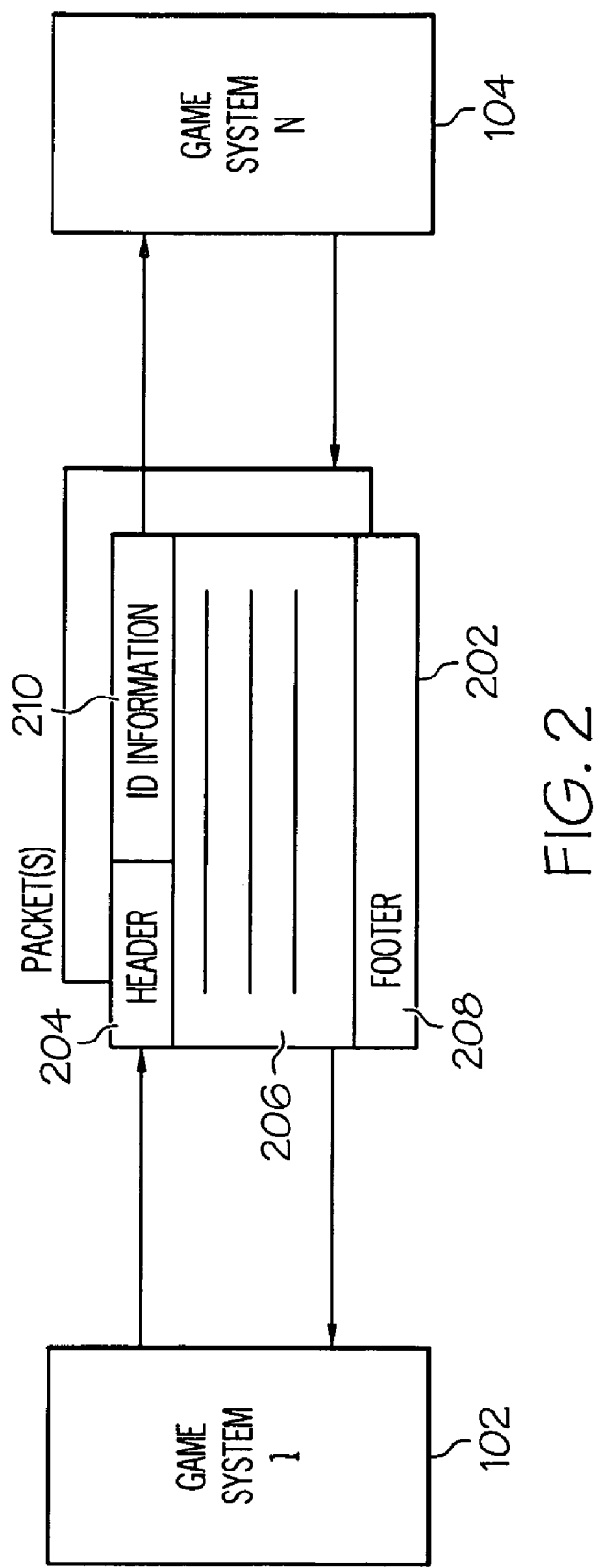
FIG. 2 is a block diagram illustrating one example of a packet comprising unique identifiers associated gaming software according to an embodiment of the present invention.

When a gaming system 102 communicates with another gaming system 104 for interaction with one another (e.g., when playing a multi-player game against or with the other system) each gaming system 102, 104 transmits one or more data packets 202 (such as one packet as illustrated in FIG. 2) to each other over, for example, network 106. Each of these packets 202 contains within the ID information field 210 one or more of the identifiers 128, 130 associated with either the local copy 110, 112 (the child ID 130) or the game media 108 (the parent ID 128) depending on the component sending the packet. FIG. 2 shows one example of the aforementioned packet 202. It should be noted that the packet 202 illustrated in FIG. 2 is only one example and further embodiments of the present invention are able to use any suitable packet format. The packet 202 of FIG. 2 comprises a header 204 identifying the beginning of the packet 202, a body 206 comprising various data, and a footer 208 identifying the end of the packet 202. The packet 202 also comprises the unique identifier field 210, which can contain one or both of the parent ID 128 or the child ID 130, associated with the sending component (a local copy 110, 112 or game media 108) that is interacting with the other gaming systems. Although shown in the header section 204 of the packet 202, the unique identifier information field 210 can reside anywhere within the packet 202.

The content manager 116, 118 of each gaming system 102, 104 then analyzes the received packets 202 to determine if the connection is between a game media 108 (a parent) or a local copy 110, 112 (a child). The content manager 116, 118 can determine that the connection is with a game media 108 by identifying that the unique identifier 124 is based upon a parent ID 128. The content manager 116, 118 can determine that the connection is with a child copy 110, 112 by identifying that the unique identifier 124 is related to the child ID 130.

Once the content manager 116, 118 of a gaming system 102, 104 determines the component type (local copy or game media) that the system is connected with, the content manager 116, 118 analyzes the received unique identifiers 120, 122 with respect to the unique identifier of the component being used at its respective gaming system. As discussed above, the content manager 116, 118 can be configured to allow or deny operations based on whether its system is executing software contained in a local copy of the game title or software contained in the original game media, and whether that system is interacting with a system executing software contained in a local copy or in the original game media.

For example, if a local copy 110 is being used at the current system 102, the content manager 116 compares the child ID 130 associated with the local copy 110 to the unique ID contained in the identifier information field 210 of data packet 202 received from the other systems 104. In one embodiment, if the received unique identifier 124 is a child ID 130, the content manager 116 compares the child ID 130 of its system 102 with the child ID 130 of the coupled system 104. If the child IDs match, the content manager 116 determines that the local copies 110, 112 at each of the systems 102, 104 were created from the same game media 108.

Based upon the determination of the origin of the software being executed by the coupled system 104 with which the system is in communications, the content manager 116 can then take appropriate actions such as preventing its system 102 from interacting with the coupled system 104, preventing the user of the system from using the local copy 110, prompting the user to delete the local copy 110, automatically deleting the local copy 110, or perform other actions. It should be noted that the content manager 116 can also be configured to allow its system 102 to interact with sibling copies (local copies created from the same game media). In this example, the content manager 116 allows its system to interact with the coupled system 104.

In another example, a local copy 110 is being used at the current system 102 and a game media 108 is being used at the coupled system 104. Therefore, the content manager receives a parent ID 128 from the coupled system 104. The content manager 116 compares the parent ID 128 associated with the local copy 110 to the parent ID 128 received from the coupled system 104. If the parent IDs match, the content manager 116 determines that its local copy 110 was created from the game media 108 being used at the coupled system 104. Therefore, the content manager 116 can take appropriate action. For example, if the content manager 116 is configured to prevent a local copy 110 from interacting with its parent (the game media 108 from which it was created from), the content manager 116 can take similar actions to that already discussed above. On the other hand, the content manager 116 can be configured to allow this type of interaction.

It should be noted that the inverse of the two examples given above can be handled in a similar fashion. For example, if a game media 108 is being used at the current system 102, the content manager 116 can perform similar actions as discussed above if a parent ID is received that matches the parent ID of the game media 108 being used at its system 102. If the unique ID 120, 122 received by a content manager 116, 118 does not match the unique ID 124 of the local copy 110, 112, or game media 108 being used at the respective system, the content manager can take the appropriate action. For example the content manager 116, 118 can either allow the interaction or prevent the interaction depending on how the content manager 116 is configured.

It should be noted that the packets 202 comprising the unique identifiers 124 can be transmitted directly from a gaming system 102 to another gaming system 104 or can be transmitted to a server 132 and then relayed to the receiving gaming system. Alternatively, a device manager 134, which is similar to the content manager 116, 118 of a gaming system 102, 104, residing at a server 132, can perform the analysis of identifiers discussed above. In this embodiment, the packet 202 sent to the server 132 can also includes a unique device ID that uniquely identifies a gaming system 102, 104. The device manager 134 compares each of the unique identifiers 124 (child and/or parent IDs) received from a gaming system 102, 104 to determine either if local copies 110, 112 were created from the same parent game media 108 or if a local copy 110, 112 is trying to interact with its parent game media 108 (and vice versa). The device manager 134 can then take the same actions as the content manager discussed above depending on how the device manager 134 is configured.

For example, if the device manager 134 determines that a local copy 110, 112 is trying to interact with a sibling local copy or that a local copy 110, 112 is trying to interact with its parent game media 108 (and vice versa), the device manager 134 is able to prevent the gaming systems 102, 104 from interacting with one another.

As can be seen from the above discussion, the foregoing embodiments work to prevent illegal use of digital content. Although users may be allowed to create local copies of game from a single gaming media, the foregoing embodiments prevent users from using these local copies in a shared environment (e.g., a multi-player environment) that would violate the software license for that product. Therefore, compliance with the copyright and licensing agreement associated with the game is maintained.

Returning to FIG. 1, a user is not required to create a local copy from a game media 108. For example, a user can download a game 136 from a server 132 comprising a software database 135, which can be an on-line store or a gaming server offering game downloads. Once the game 136 is downloaded from the server 134, a local copy 110, 112 is created as discussed above. Similar to the embodiments discussed above, the contents residing in the software database 135 include gaming software 138 and unique IDs 140 associated with the content. The unique IDs 140 can comprise a parent ID 142. The parent ID 142 is associated with the on-line store/community from which the game 136 is downloaded from.

In this embodiment, when a gaming system 102 communicates with another gaming system 104 for interacting with one another via their local copies 102, 104, the content manager 116, 118 of each system 102, 104 receives a packet 202 from the other system as discussed above. The content manager 116, 118 compares each of the unique identifiers 140 such as the parent ID 142 within each packet 202 to the unique identifier 120, 122 such as the parent ID 128 associated with its own local copy 110, 112. If the unique identifiers match, the user is allowed to interact with the other user. In other words, the gaming system 102 is requesting to interact with another gaming system 104 that comprises a local copy of a game that was downloaded from the same on-line store/community. However, if the unique identifiers do not match in one embodiment of the present invention, the content manager 116, 118 prevents its system from interacting with the other system(s).

In an alternative embodiment implementing this scenario, each gaming system 102, 104 does not communicate directly with other systems. Each system communicates with a server 132 that supports an on-line gaming community. In this example, the packets 202 comprising the unique identifiers of the on-line store, device, and/or the game itself are sent to the server 132. The device manager 134 residing at the server 132 determines that a group of systems 102, 104 are requesting to interact with one another using a particular local copy 110, 112. The device manager 132 compares each of the parent IDs received from each requesting system to determine if they match. Gaming systems with matching parent identifiers are allowed to play one another while devices associated with non-matching identifiers are notified that their request has been denied. Stated differently, the device manager 134, in this embodiment, only allows gaming systems comprising local copies of a game downloaded from the same on-line store/community to interact with one another.

It should be noted that the server 134 does not necessarily need to be the same server that the game was downloaded from. For example, the game program can be configured to direct a gaming system 102, 104 to a particular server for interacting with other systems. The device manager 134 at this server 132 can be configured to only allow devices with local copies downloaded from, for example, a particular store to interact with one another. Alternatively, if the server 132 is the same server where the local copy 110, 112 was downloaded from, the device manager 134 can compare each of the unique identifiers to its own local identifier to determine if they match.

In another embodiment, the unique identifiers 120, 122 can also include generational information for unique identifiers. For example, a user downloads a game from a server 132. The user can share the downloaded game with his/her friends. This group can now play against each other via the server 132 from where the game was downloaded. In this example, the unique identifiers 120, 122 include a list of generational unique identifier information (e.g., great grandfather, grandfather, father, etc) where "great grandfather" is the identifier of the server 132. Alternatively, select generational information such as (but not limited) "great grandfather", the one generation up "parent", and/or one generation down "child" can be included within unique identifiers 120, 122. This allows a system 102, 104 to track where a local copy 110, 112 was downloaded from and what systems the local copy 110, 112 has been downloaded to. For example, a gaming system 102, 104 can identify that it is a child of a specific parent (game media, server, or another local copy) and is able to identify the parent of its parent and its own children.

These foregoing embodiments are advantageous because they allow retailers and other software providers the ability to offer unique services to their customers. For example, a retailer can offer a unique online gaming community for its customers. The foregoing embodiments prevent users that did not purchase their local copy of a game from the store from accessing its on-line servers. This ensures the integrity of the unique services provide by the retailer.

In another embodiment, a gaming system 102, 104 or any other data processing application can generate one or more data files 144, 146. These data files 144, 146, in one embodiment, are associated with a game. For example, the data files 144, 146 can be (but not limited to) user profiles and saved game data. Further embodiments are able to control access to other application data such as text files, data files, and the like. When a gaming system 102, 104 creates a data file 144, 146, it associates a creator ID 148, 150 with each data file 144, 146. The creator ID 148, 150, in one embodiment, is related to and uniquely identifies the gaming system 102, 104 that created the file 144, 146. Therefore, if a user transfers a data file 144, 146 to another system, the content manager 116, 118 of that system can determine if the data file was created by the current device. If the data file was not created by the device associated with the content manager 116, 118, the content manager 116, 118 prevents the user from using that particular data file. As can be seen, this embodiment, controls how a gaming system 102, 104 interacts with gaming system generated output located on another system(s).

Example of an Information Processing System

Figure 3:
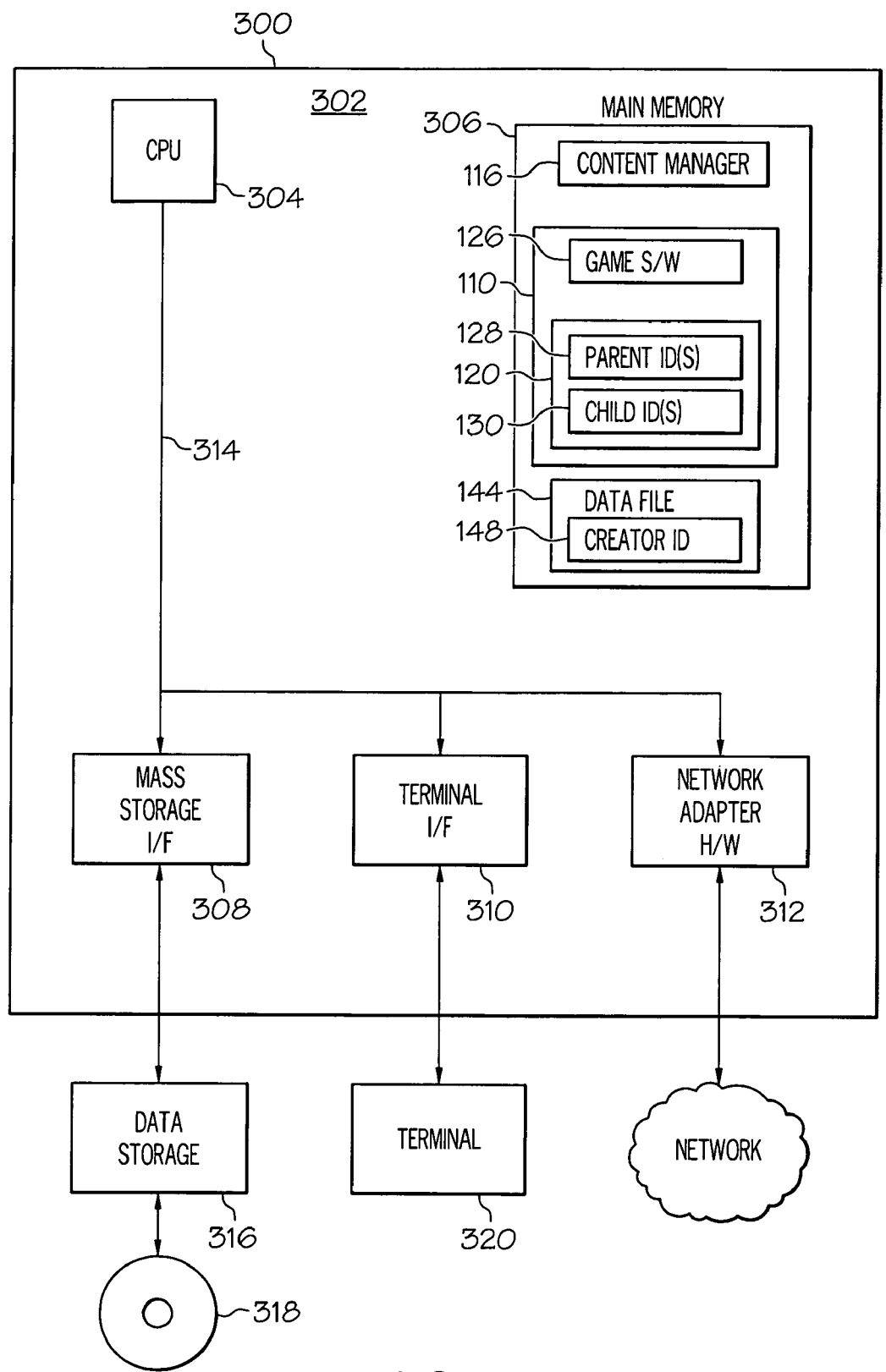
FIG. 3 is a block diagram illustrating one example of an information processing system environment according to an embodiment of the present invention.

FIG. 3 is a block diagram illustrating a more detailed view of an information processing system 300 according to an embodiment of the present invention. It should be noted that the information processing system 300 can be (but is not limited to) a gaming console, a portable gaming device, the server 132, a desktop computer, a notebook computer, or a personal digital assistant. It should be noted that user interfaces such as (but not limited to) a keyboard, pointing devices, joystick, speakers, microphones, and display(s) are not shown for the sake of brevity.

The information processing system 300 includes a computer 302. The computer 302 has a processor 304 that is connected to a main memory 306, mass storage interface 308, terminal interface 310, and network adapter hardware 312. A system bus 314 interconnects these system components. The mass storage interface 308 is used to connect mass storage devices, such as data storage device 316, to the information processing system 102. One specific type of data storage device is a computer readable medium reader, such as an optical disk drive, which may be used to read a computer readable medium, such a CD 318 or DVD (not shown) that is encoded with a program. Another type of data storage device is a data storage device configured to support, for example, NTFS type file system operations.

The main memory 306, in one embodiment, includes the content manager 116, a local copy 110 of a game(s), and optional data files 144 as discussed above in greater detail. The content manager is adapted to manage interaction between the game system one or more other gaming systems comprising protected media. The content manager 116, in one embodiment, includes a unique identifier 322 receiver that is adapted to receive at least one unique identifier from a remote processing system such as the gaming system 104. The at least one remote unique identifier is associated with a remote software package that is on the remote processing system such as the local copy 112 or a game on a game media. The content manager 116 also includes, in one embodiment, a comparator 324 that is adapted to compare, in response to the receiving, the at least one remote unique identifier and a local unique identifier associated with a local software package on a local processing system. The local software package corresponds to the remote software package. The at least one remote unique identifier indicates that the remote software package is one of a parent copy and a child copy of a software package executable. The local unique identifier indicates that the local software package is one of a parent copy and a child copy of the software package executable. The content manager 116, in one embodiment, further includes an interaction authorizer 326 that is adapted to authorize an operation of the local software package based upon the comparing.

Although illustrated as concurrently resident in the main memory 306, it is clear that respective components of the main memory 306 are not required to be completely resident in the main memory 306 at all times or even at the same time. In one embodiment, the information processing system 300 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the information processing system 300.

Although only one CPU 304 is illustrated for computer 302, computer systems with multiple CPUs can be used equally effectively. Various embodiments of the present invention further incorporate interfaces that each includes separate, fully programmed microprocessors that are used to off-load processing from the CPU 304. Terminal interface 310 is used to directly connect one or more terminals 320 to computer 302 to provide a user interface to the computer 302. These terminals 320, which are able to be non-intelligent or fully programmable workstations, are used to allow system administrators and users to communicate with the information processing system 300. The terminal 320 is also able to consist of user interface and peripheral devices that are connected to computer 302 and controlled by terminal interface hardware included in the terminal I/F 310 that includes video adapters and interfaces for keyboards, pointing devices, and other devices/interfaces.

An operating system (not shown) included in the main memory is a suitable multitasking operating system such as (but not limited to) the Linux, UNIX, Windows XP, and Windows Server 2001 operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 300. The network adapter hardware 312 is used to provide an interface to a network 106. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a program product via CD or DVD, e.g. CD 318, CD ROM, or other form of recordable media, or via any type of electronic transmission mechanism.

Operation Flow for Local Content Creation

Figure 4:
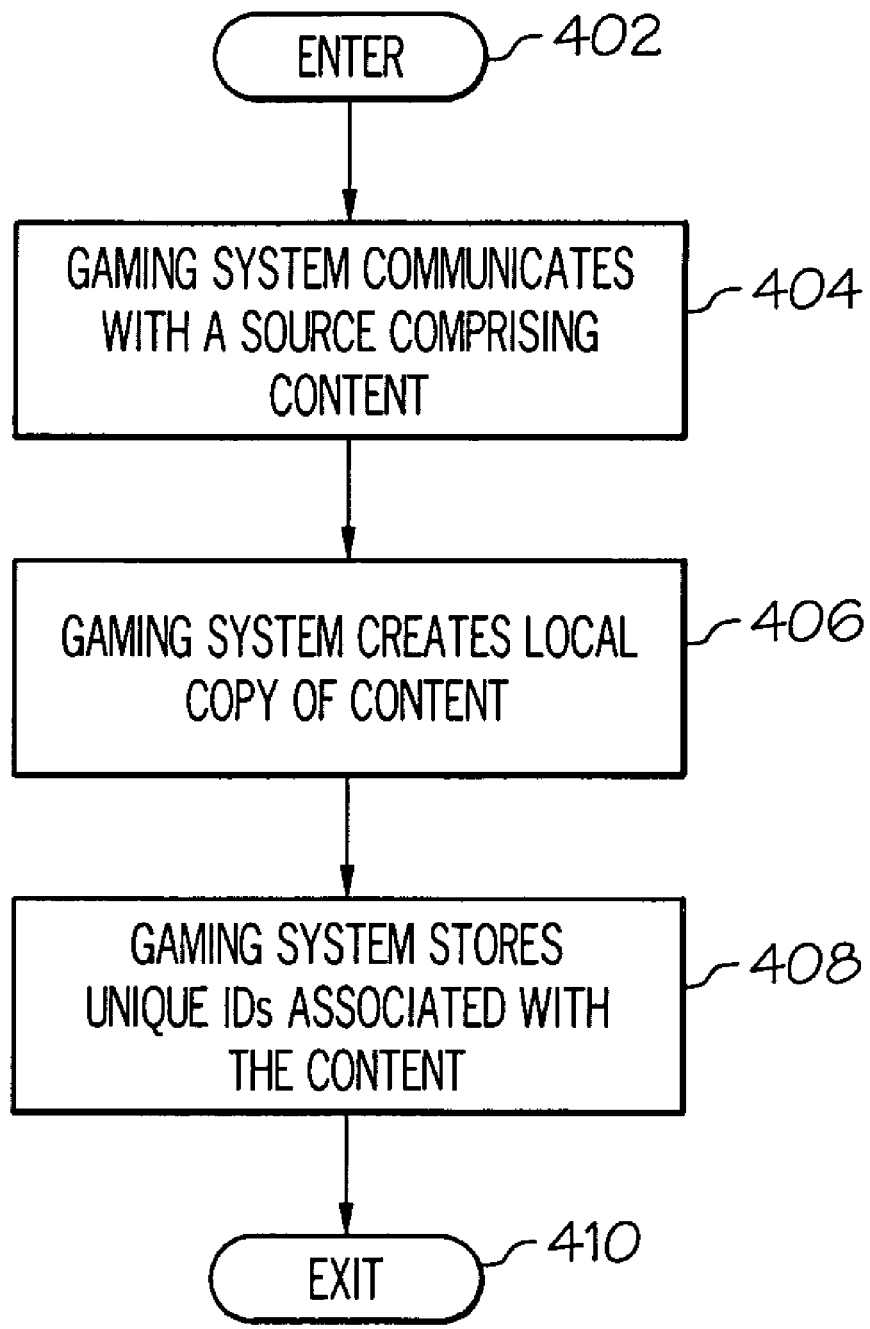
FIG. 4 is an operational flow diagram illustrating an overall process of creating a local copy of game within a gaming system according to an embodiment of the present invention.

FIG. 4 is an operational flow diagram illustrating a process of creating a local copy of a game at a gaming system. The operational flow diagram of FIG. 4 begins at step 402 and flows directly to step 404. A gaming system 102, at step 404, communicates with a source comprising gaming content. For example, the source can be an on-line store at a server 132 or a game media 108 such as an optical disk. The gaming system 102, at step 406, creates a local copy 110 in its memory. The gaming system 102, at step 408, also stores unique identifiers 120 with the local copy 110. For example, a child identifier 130 can be stored indicating that the local copy 110 was created from a particular game media 108. A parent identifier 128 can also be stored to identify the parent game media 108 used to create the local copy 110. The control flow then exits at step 410.

Operational Flow for Gaming System Interaction Management

Figure 5A:
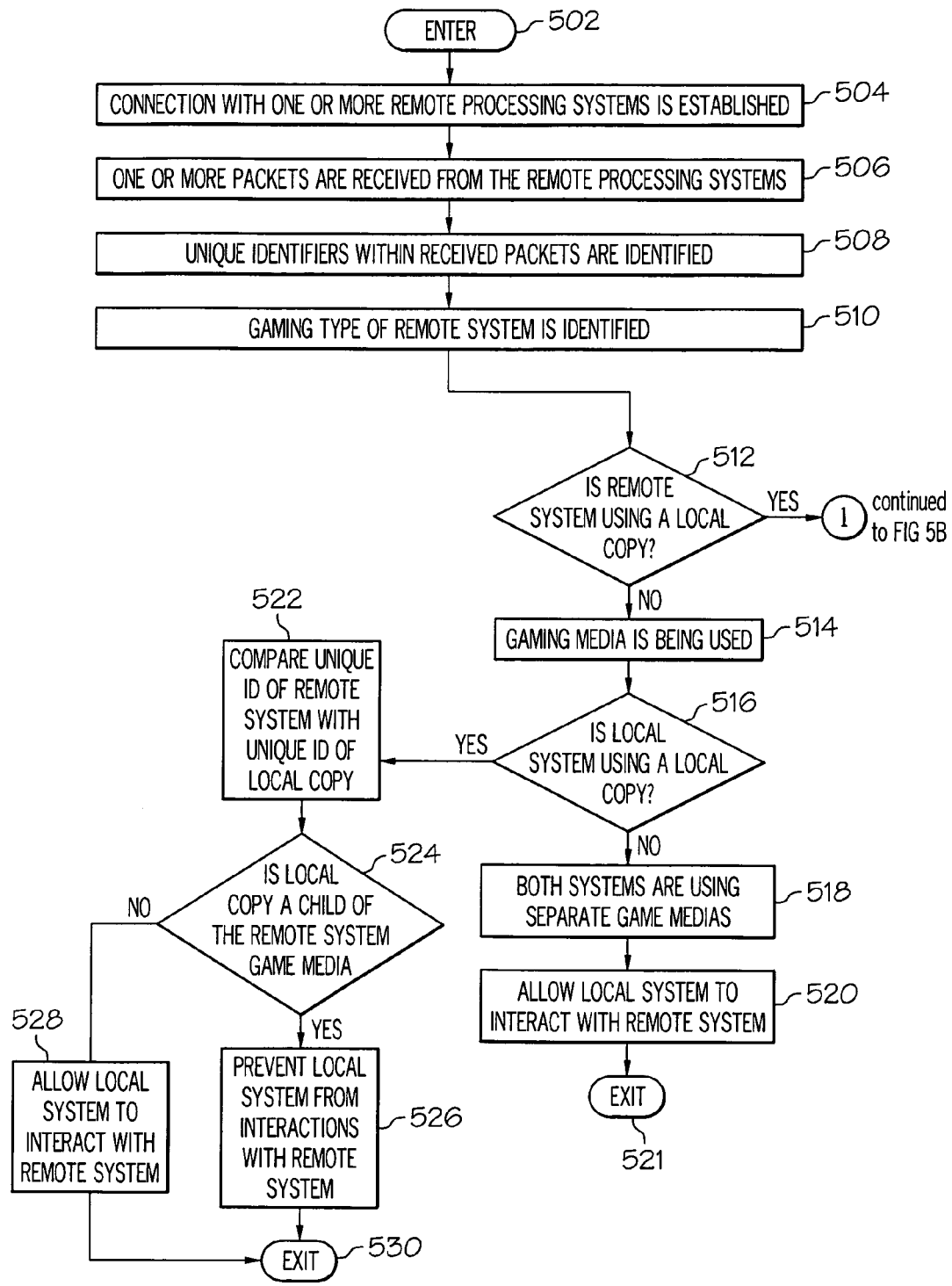
FIGS. 5A and 5B depict an operational flow diagram illustrating one process of managing the interaction of gaming systems based on whether the systems are using a local copy of a game or a gaming media according to an embodiment of the present invention.
Figure 5B:
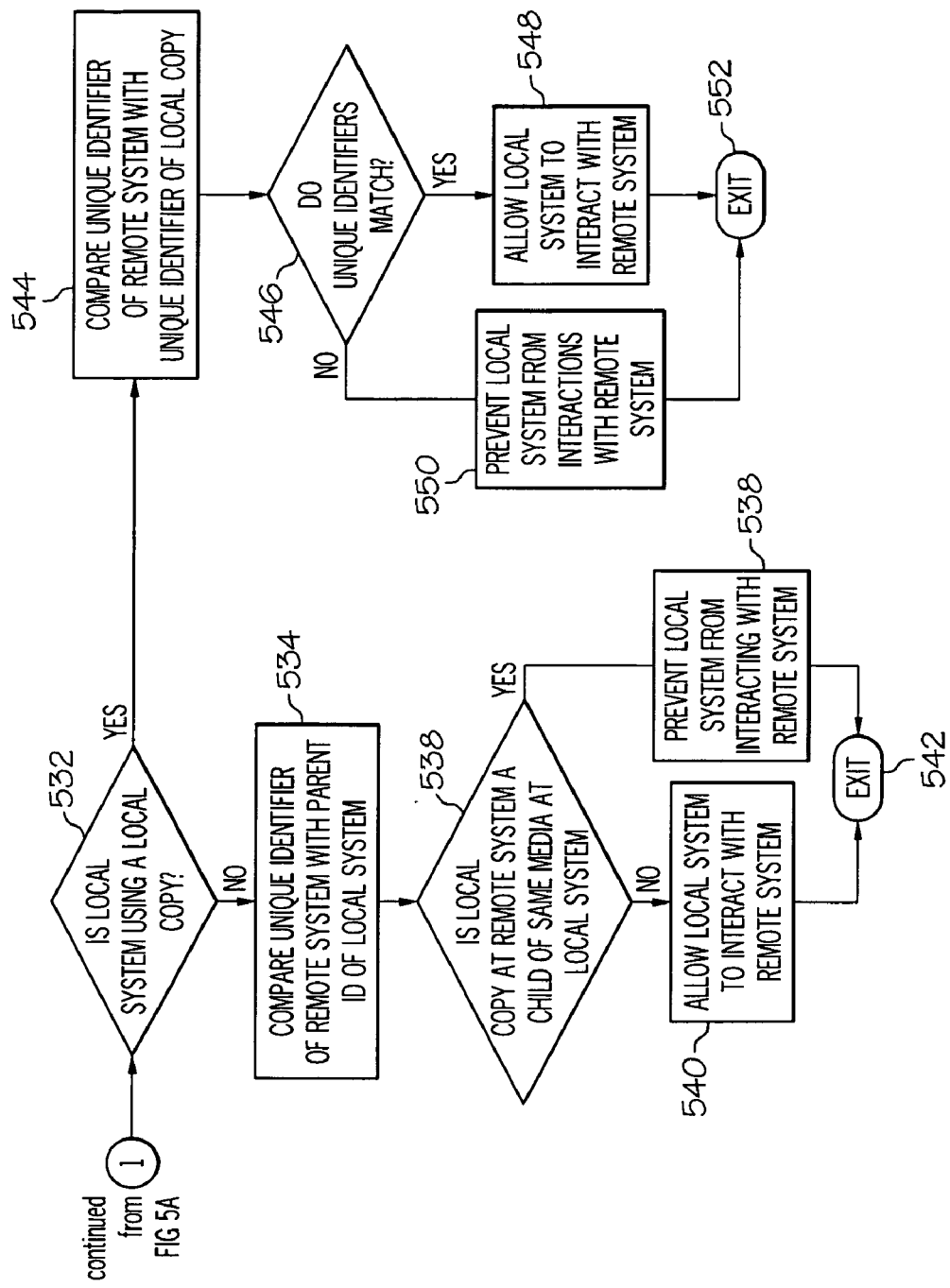
Figure 6:
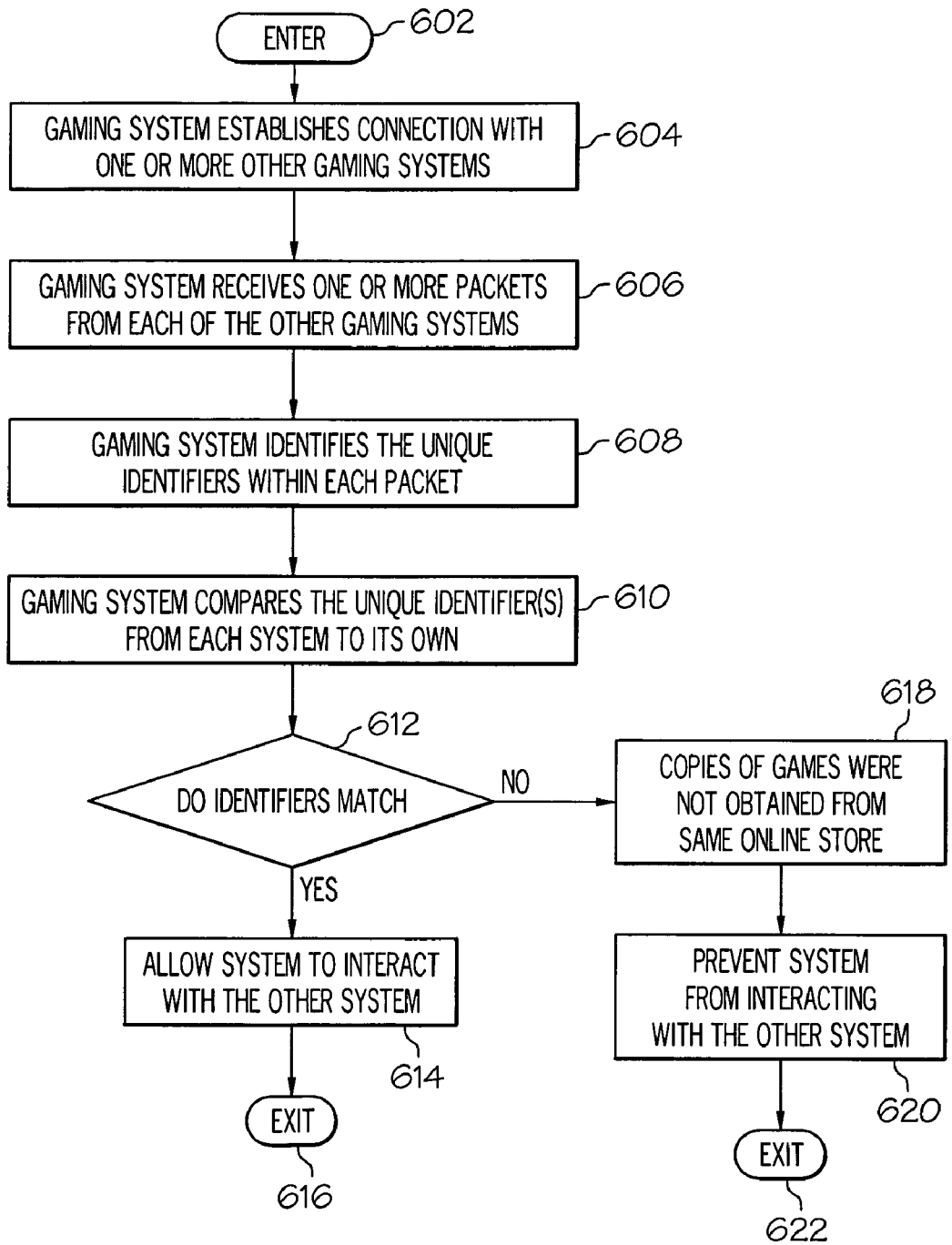
FIG. 6 is an operational flow diagram illustrating another process of managing the interaction of gaming systems based on whether the systems are using a local copy of a game or a gaming media according to an embodiment of the present invention.

FIGS. 5A, 5B, and FIG. 6 are operational flow diagrams illustrating processes of managing gaming system interaction based on unique identifiers associated with gaming software being used. The operational flow diagram of FIGS. 5A and 5B begins at step 502 and flows directly to step 504. The gaming system 102, at step 504, establishes a connection with one or more remote processing systems such as another gaming system 104. The content manager 116, at step 506, receives one or more packets 202 from each of the other gaming systems 104. In one embodiment, the packets 202 are received in the course of establishing a multi-player game session with the other gaming systems 104. The content manager 116, at step 508, identifies each of the remote unique identifiers such as unique identifiers 122 within the received packets 202. The remote unique identifier(s), in one embodiment, is associated with a remote software package that is on the remote processing system.

The content manager 116, at step 510, identifies the type of gaming software being used at the other systems. For example, the received packets 202 can include parent identifiers 128 and/or child identifiers 120. A parent identifier 129 indicates that a game media 108 such as an optical disk is being used at the other system 104. A child identifier 130 indicates that a local copy 112 is being used at the other systems 104. The content manager 116, at step 512, determines if the other system 104 is using a local copy 112. If the result of this determination is negative, the content manager 116, at step 514, determines that the other system 104 is using a game media 108.

The content manager 116, at step 516, determines if its system 102 is using a local copy 110 of the game 126. If the result of this determination is negative, the content manager 116, at step 518, determines that both its current system 102 and the other system 104 are using separate game media 108. The content manager 116, at step 520, allows its system 102 to interact with the other system 104. The control flow then exits at step 521. If the result of this determination is positive, the content manager 116, at step 522, compares the unique identifier 122 of the other system 104 with the unique ID 120 of the gaming software 126 being used at its local system 102. The content manager 116, at step 524, determines if the local copy 110 at its system 102 is a child of a game media being used at the other system 104. For example, the content manager 116 is trying to determine if its local copy 110 was created from the game media being used at the other system 104.

This can be determined by various methods. For example, a game media can comprise a parent ID 128 and a child ID 130. Whenever a local copy 110, 112 is created from the game media it stores the child ID 130 with the local copy 110, 112. In one embodiment, if the other system 104 is using a game media, the content manager 118 at that system 104 can send the child ID 130 associated with that game media. In other words, the child ID 130 used by that game media to identify local copies created from it is sent in the packet 202. Therefore, the content manager 116 can compare a child ID 130 of its local copy 110 in its system 102 with the child ID associated with the game media being used at the other system 104. If the IDs match, the local copy 112 at the other system 104 was created from the game media 108.

In another embodiment, the game media can also store its parent ID 128 with a local copy 110, 112. The parent ID is also sent in the packet 202 received from the other system 104 using a game media. This allows the content manager 116 to compare the parent ID 128 of the game media used to create the local copy 110 at its system 102 with the parent ID associated with the game media being used at the other system 104. If these two parent IDs match, the local copy 110 at its system 102 was created from the game media being used at the other system 102.

If the content manager 116 determines that the local copy 112 of its system 102 is a child of the game media of other system 104 it prevents its system 102 from interacting with the other system 104 at step 526. If however, the content manager 116 determines that the local copy 110 of its system 104 is not a child of the game media at the other system 104, the content manager 116, at step 528, allows its system 102 to interact with the other system 104. The control flow then exits at step 530.

Returning to step 512, if the result of this determination is positive, the content manager 116, at step 532, determines if the gaming software being used at its system 102 is a local copy. If the result of this determination is negative, its system 102 is using a game media 108 and the control flows to step 534. The content manager 116, at step 534, compares the unique identifier 122 of the other system 104 with the parent ID of the gaming software 114 being used at its local system 102. The content manager 116, at step 536, determines if the local copy 112 at the other system 104 is a child of the game media 108 at its current system 102. For example, the content manager 116 is trying to determine if the local copy 112 at the other system 104 was created from the game media 108 being used at its current system 102. This can be determined in a similar fashion as discussed above with respect to steps 522-530.

If the content manager 116 determines that the local copy 112 of the other system 104 is a child of its game media 108 it prevents its system 102 from interacting with the other system 104 at step 538. If however, the content manager 116 determines that the local copy 112 at the other system 104 is not a child of its game media 108, the content manager 116, at step 540, allows its system to interact with the other system 104. The control flow then exits at step 542.

Returning to step 532, if the result of this determination is positive, the content manager 116, at step 544, compares the unique identifier 122 received from the other system 104 with the unique identifier 120 of its local copy 110. The content manager 116, at step 546, determines if the unique identifiers 120, 122 such as the child IDs 130 match. If the result of this determination is negative, the content manager 116, at step 548 allows its system 102 to interact with the other system 104. If the result of this determination is positive, the content manager 116, at step 550, prevents its system 102 from interacting with the other system 104. The control flow then exits at step 552.

FIG. 6 is an operational flow diagram illustrating another process of managing gaming system interaction based on unique identifiers associated with gaming software being used. The operational flow diagram of FIG. 6 begins at step 602 and flows directly to step 604. The gaming system 102, at step 604, establishes a connection with one or more other systems 104. The content manager 116, at step 606, receives one or more packets 202 from each of the other gaming systems 104. The content manager 116, at step 608, identifies each of the unique identifiers 122 within the received packets 202. In this embodiment, the unique identifiers 122 identify the on-line store used to create the local copies 110, 112 of a game on a system 102, 104.

The content manager 116, at step 610, compares the unique identifier 120 associated with the gaming software 126 being used at its system 102 to the unique identifier 122 received from the other system 104. In this embodiment, the content manager 116 is trying to determine of the local copy 110 at its system 102 was downloaded from the same location as the local copy 112 of the other system 104. The content manager 116, at step 612 determines if the unique identifiers 120, 122 match. If the result of this determination is positive, the content manager 116, at step 614, allows its system 102 to interact with the other system 104. The control flow then exits at step 616. If the result of this determination is negative, the content manager 116, at step 618, determines that the local copies 110, 112 were not downloaded from the same location. The content manager 116, at step 620, prevents its system 102 from interacting with the other system 104. The control flow then exits at step 622.

Non-Limiting Examples

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a gaming system, for managing interaction between one or more other gaming systems comprising protected media, the method comprising:

executing, with a processor of an information processing system, the following:

receiving at least one remote unique identifier from a remote processing system, wherein the at least one remote unique identifier is associated with a remote software package that is stored on the remote processing system;

comparing, in response to the receiving, the at least one remote unique identifier and a local unique identifier associated with a local software package stored on a local processing system, the local software package corresponding to the remote software package, wherein the at least one remote unique identifier indicates that the remote software package is one of a parent copy and a child copy of a software package executable and the local unique identifier indicates that the local software package is one of a parent copy and a child copy of the software package executable; and authorizing an operation of the local software package based upon the comparing.

2. The method of claim 1, wherein the at least one remote unique identifier further identifies a location from which the remote software package was downloaded from.

3. The method of claim 1, wherein the comparing comprises:

determining, based upon the at least one remote unique identifier, that the remote processing system is using a local copy of the software package executable; and determining that the local unique identifier is derived from the at least one remote unique identifier, wherein the authorizing comprises preventing, in response to determining that the local unique identifier is derived from the at least one remote unique identifier, the local processing system from interacting with the remote processing system.

4. The method of claim 1, wherein the comparing comprises:

determining, based upon the remote unique identifier, that the remote software package is the parent copy of the software package executable; and determining that the local unique identifier is derived from the at least one unique identifier, wherein the authorizing comprises preventing, in response to the determining that the local unique identifier is derived from the at least one unique identifier, the local processing system from interacting with the remote processing system.

5. The method of claim 1:

wherein the comparing comprises determining that the at least one remote unique identifier is derived from the local unique identifier, and wherein the authorizing comprises allowing, in response to the determining, the local processing system to interact with the remote processing system.

6. The method of claim 1:

wherein the comparing comprises determining that the at least one remote unique identifier is derived from the local unique identifier, and wherein the authorizing comprises denying, in response to the determining, the local processing system to interact with the remote processing system.

7. The method of claim 1:

wherein the comparing comprises determining that the at least one remote unique identifier is not derived from to the local unique identifier, and wherein the authorizing comprises allowing, in response to the determining, the local processing system to interact with the remote processing system.

8. The method of claim 1:

wherein the comparing comprises determining that the at least one remote unique identifier is not derived from to the local unique identifier, and wherein the authorizing comprises denying, in response to the determining, the local processing system to interact with the remote processing system.

9. The method of claim 1, wherein the software package executable comprises a game.

10. The method of claim 1, further comprising:

receiving a data item from the remote processing system, the data item comprising the at least one remote unique identifier, wherein the authorizing comprises controlling access to the data item by the local software package.

11. A gaming system comprising:

a memory;

a processor communicatively coupled to the memory; and a content manager adapted to manage interaction between a local processing system and one or more other systems comprising protected media, wherein the content manager comprises:

a unique identifier receiver adapted to receive at least one remote unique identifier from a remote processing system, wherein the at least one remote unique identifier is associated with a remote software package that is stored on the remote processing system;

a comparator adapted to compare, in response to the receiving, the at least one remote unique identifier and a local unique identifier associated with a local software package stored on the local processing system, the local software package corresponding to the remote software package, wherein the at least one remote unique identifier indicates that the remote software package is one of a parent copy and a child copy of a software package executable and the local unique identifier indicates that the local software package is one of a parent copy and a child copy of the software package executable; and an interaction authorizer adapted to authorize an operation of the local software package based upon the comparing.

12. The gaming system of claim 11, wherein the comparator is further adapted to compare by:

determining, based upon the at least one remote unique identifier, that the remote processing system is using a local copy of the software package executable; and determining that the local unique identifier is derived from the at least one remote unique identifier, wherein the authorizing comprises preventing, in response to determining that the local unique identifier is derived from the at least one remote unique identifier, the local processing system from interacting with the remote processing system.

13. The gaming system of claim 12, wherein the comparator is further adapted to compare by:

determining, based upon the remote unique identifier, that the remote software package is the parent copy of the software package executable; and determining that the local unique identifier is derived from the at least one unique identifier, wherein the authorizing comprises preventing, in response to the determining that the local unique identifier is derived from the at least one unique identifier, the local processing system from interacting with the remote processing system.

14. A computer program storage product for managing interaction between one or more other gaming systems comprising protected media, the computer program storage product storing a machine executable program comprising instructions for:

receiving at least one remote unique identifier from a remote processing system, wherein the at least one remote unique identifier is associated with a remote software package that is stored on the remote processing system;

comparing, in response to the receiving, the at least one remote unique identifier and a local unique identifier associated with a local software package stored on a local processing system, the local software package corresponding to the remote software package, wherein the at least one remote unique identifier indicates that the remote software package is one of a parent copy and a child copy of a software package executable and the local unique identifier indicates that the local software package is one of a parent copy and a child copy of the software package executable; and authorizing an operation of the local software package based upon the comparing.

15. The computer program storage product of claim 14, wherein the instructions for comparing further comprise instructions for:

determining, based upon the at least one remote unique identifier, that the remote processing system is using a local copy of the software package executable; and determining that the local unique identifier is derived from the at least one remote unique identifier, wherein the authorizing comprises preventing, in response to determining that the local unique identifier is derived from the at least one remote unique identifier, the local processing system from interacting with the remote processing system.

16. The computer program storage product of claim 14, wherein the instructions for comparing further comprising instructions for:
- determining, based upon the remote unique identifier, that the remote software package is the parent copy of the software package executable; and
- determining that the local unique identifier is derived from the at least one unique identifier,
- wherein the authorizing comprises preventing, in response to the determining that the local unique identifier is derived from the at least one unique identifier, the local processing system from interacting with the remote processing system.

17. The computer program storage product of claim 14:
- wherein the instructions for comparing comprise instructions for determining that the at least one remote unique identifier is derived from the local unique identifier, and
- wherein the instructions for authorizing further comprise instructions for allowing, in response to the determining, the local processing system to interact with the remote processing system.

18. The computer program storage product of claim 14:
- wherein the instructions for comparing comprise instructions for determining that the at least one remote unique identifier is derived from the local unique identifier, and
- wherein the instructions for authorizing further comprise instructions for denying, in response to the determining, the local processing system to interact with the remote processing system.

19. The computer program storage product of claim 14:
- wherein the instructions for comparing comprise instructions for determining that the at least one remote unique identifier is not derived from to the local unique identifier, and
- wherein the instructions for authorizing further comprise instructions for allowing, in response to the determining, the local processing system to interact with the remote processing system.

20. The computer program storage product of claim 14:
- wherein the instructions for comparing comprise instructions for determining that the at least one remote unique identifier is not derived from to the local unique identifier, and
- wherein the instructions for authorizing further comprise instructions for denying, in response to the determining, the local processing system to interact with the remote processing system.

21. A computer program storage product containing a software executable image for a game, the computer program storage product comprising:
- an identification storage encoded with a local unique identifier associated with a local software package stored in the memory; and
- a content manager adapted to manage interaction between a local processing system and one or more other systems comprising protected media, wherein the content manager comprises:
  - a unique identifier receiver adapted to receive at least one remote unique identifier from a remote processing system, wherein the at least one remote unique identifier is associated with a remote software package that is stored on the remote processing system;
  - a comparator adapted to compare, in response to the receiving, the at least one remote unique identifier and the local unique identifier associated with a local software package stored on the local processing system, the local software package corresponding to the remote software package, wherein the at least one remote unique identifier indicates that the remote software package is one of a parent copy and a child copy of a software package executable and the local unique identifier indicates that the local software package is one of a parent copy and a child copy of the software package executable; and
  - an interaction authorizer adapted to authorize an operation of the local software package based upon the comparing.

22. The computer program storage product of claim 21, wherein the comparator further:
- determines that the at least one remote unique identifier is derived from the local unique identifier, and
- allows, in response to determining that the at least one remote unique identifier is derived from the local unique identifier, the local processing system to interact with the remote processing system.

23. The computer program storage product of claim 21, wherein the computer program storage product is part of a game cartridge.

* * * * *